US012782198B2

(12) United States Patent
Hackett et al.

(10) Patent No.: US 12,782,198 B2
(45) Date of Patent: Nov. 3, 2026

(54) INTEGRALLY COOLED OPTICAL PROBE

(71) Applicant: RTX Corporation, Farmington, CT (US)

(72) Inventors: Bryan J. Hackett, Berlin, CT (US); Hunter Tomick, Lebanon, CT (US); Eli Warren, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 75 days.

(21) Appl. No.: 18/808,667

(22) Filed: Aug. 19, 2024

(65) Prior Publication Data

US 2026/0049870 A1 Feb. 19, 2026

(51) Int. Cl.
*G01J 5/00* (2022.01)
*G01J 5/02* (2022.01)
(Continued)

(52) U.S. Cl.
CPC ........... *G01J 5/0088* (2013.01); *G01J 5/0215* (2013.01); *G01J 5/04* (2013.01); *G01J 5/061* (2013.01);
(Continued)

(58) Field of Classification Search
CPC ........ G01J 5/0088; G01J 5/021; G01J 5/0215; G01J 5/022; G01J 5/0225; G01J 5/04;
(Continued)

(56) References Cited

U.S. PATENT DOCUMENTS 2,492,353 A * 12/1949 Brackett ................ G02B 23/00 359/403
5,201,227 A 4/1993 Iinuma et al.
(Continued)

FOREIGN PATENT DOCUMENTS

EP 3413115 A2 12/2018
WO 2023285315 A1 1/2023

OTHER PUBLICATIONS

J. Manara,et al Long wavelength infrared radiation thermometry for non-contact temperature measurements in gas turbines, Infrared Physics & Technology, vol. 80, 2017,pp. 120-130, ISSN 1350-4495, https://doi.org/10.1016/j.infrared.2016.11.014. (Year: 2017).*
(Continued)

*Primary Examiner* — Kara E. Geisel
*Assistant Examiner* — Jonathon Cook

(57) ABSTRACT

A housing for internal components of an optical probe is provided. The housing includes a housing body including an outer surface and an inner surface opposite the outer surface. The housing body is elongated along a center longitudinal axis from a proximal end to a distal end. The inner surface defines and annularly surrounds a cavity that is open at the proximal end and closed at the distal end. The housing includes a purge channel that includes a gas inlet and a gas outlet. The purge channel extends axially relative to the center longitudinal axis from the gas inlet to the gas outlet. The purge channel is formed between the outer surface and the inner surface of the housing body. The gas outlet is located distally from the gas inlet and through the inner surface of the housing body. The gas outlet directs gas into the cavity toward the distal end.

20 Claims, 7 Drawing Sheets

(51) Int. Cl.

| | |
|---|---|
| ***G01J 5/04*** | (2006.01) |
| ***G01J 5/061*** | (2022.01) |
| ***G01J 5/08*** | (2022.01) |
| ***G01J 5/42*** | (2006.01) |

(52) U.S. Cl.
CPC ............... *G01J 5/0881* (2013.01); *G01J 5/42* (2013.01); *G01J 5/022* (2013.01); *G01J 5/0884* (2013.01)

(58) Field of Classification Search
CPC .. G01J 5/042; G01J 5/051; G01J 5/061; G01J 5/0814; G01J 5/0879; G01J 5/0881; G01J 5/0884; G01J 5/0896
See application file for complete search history.

(56) References Cited

U.S. PATENT DOCUMENTS

| | | | | |
|---|---|---|---|---|
| 8,899,049 | B2 | 12/2014 | Krull | |
| 9,175,988 | B2 * | 11/2015 | Kieliger | G01D 11/245 |
| 9,856,748 | B2 * | 1/2018 | Johnston | F01D 17/02 |
| 11,525,371 | B2 | 12/2022 | Turcotte et al. | |
| 2009/0229811 | A1 * | 9/2009 | Schmitt | G01J 5/0014 165/96 |
| 2015/0049396 | A1 | 2/2015 | Lemieux | |
| 2015/0083919 | A1 * | 3/2015 | Wind | F01D 21/003 250/341.2 |

OTHER PUBLICATIONS

European Search Report dated Jan. 20, 2026, in connection with European Patent Application No. 25196251.0, 7 pages.

* cited by examiner

INTEGRALLY COOLED OPTICAL PROBE

TECHNICAL FIELD

This disclosure relates generally to gas turbine engines. More specifically, this disclosure relates to an integrally cooled optical probe.

BACKGROUND

A gas turbine engine of an aircraft typically includes a combustion system. The combustion system is located between a compressor and a turbine. The combustion system receives compressed air from the compressor and fuel from a fuel injection system. The combustion system carries out a combustion process to produce high-energy gases to produce thrust and turn various rotatable blades of the turbine, such as high pressure turbine (HPT) blades, intermediate pressure turbine (IPT) blades, or low pressure turbine (LPT) blades. The combustion process generates a large amount of heat that the high-energy gases convey to the various rotatable blades of the turbine. These blades usually have thermal operating limits, such as upper and lower operating temperatures. A long wave infrared (LWIR) sensor can be strategically positioned within the gas turbine engine such that a probe is pointed toward one of the various rotatable blades to measure the temperature of the blade during operation without contacting the blade. The probe of the LWIR sensor can include a set of lenses.

SUMMARY

This disclosure relates to an integrally cooled optical probe.

As one example, a housing for internal components of an optical probe is provided. The housing includes a housing body including an outer surface and an inner surface opposite the outer surface. The housing body is elongated along a center longitudinal axis from a proximal end to a distal end. The inner surface defines and annularly surrounds a cavity that is open at the proximal end and closed at the distal end. The housing includes a hollow purge channel that includes a gas inlet and a gas outlet. The purge channel extends axially relative to the center longitudinal axis from the gas inlet to the gas outlet. The purge channel is formed between the outer surface and the inner surface of the housing body. The gas outlet is located distally from the gas inlet and through the inner surface of the housing body. The gas outlet directs gas into the cavity toward the distal end.

As another example, an optical probe is provided. The optical probe includes a housing. The housing includes a housing body including an outer surface and an inner surface opposite the outer surface. The housing body is elongated along a center longitudinal axis from a proximal end to a distal end. The inner surface defines and annularly surrounds a cavity that is open at the proximal end and closed at the distal end. The housing includes a hollow purge channel that includes a gas inlet and a gas outlet. The purge channel extends axially relative to the center longitudinal axis from the gas inlet to the gas outlet. The purge channel is formed between the outer surface and the inner surface of the housing body. The gas outlet is located distally from the gas inlet and through the inner surface of the housing body. The gas outlet directs gas into the cavity toward the distal end.

As yet another example, thermal imaging sensor is provided. The thermal imaging sensor includes an optical probe, a plenum, and a second lens. The optical probe includes a housing and internal components. The housing includes a housing body including an outer surface and an inner surface opposite the outer surface. The housing body is elongated along a center longitudinal axis from a proximal end to a distal end. The inner surface defines and annularly surrounds a cavity that is open at the proximal end and closed at the distal end. The housing includes a hollow purge channel that includes a gas inlet and a gas outlet. The purge channel extends axially relative to the center longitudinal axis from the gas inlet to the gas outlet. The purge channel is formed between the outer surface and the inner surface of the housing body. The gas outlet is located distally from the gas inlet and through the inner surface of the housing body. The gas outlet directs gas into the cavity toward the distal end. The internal components of the optical probe are contained within the cavity. The internal components include a prism and a plurality of first lenses centered about the longitudinal axis. The plenum is coupled to the gas inlet of the purge channel and is configured to receive gas from a gas source external to the thermal imaging sensor. The second lens is located outside of the housing and centered about the longitudinal axis. The second lens is coupled to the plenum.

Any single one or any combination of the following features may be used with the housing example, optical sensor example, or thermal imaging sensor example. The housing can include a view hole that extends through an entire thickness of the housing body, and the view howl is configured to guide energy emitted from an external device to impinge on the prism among internal components of the optical sensor. The gas outlet faces the prism and is configured to direct a gas expelled from the purge channel to impinge on the prism such that the gas exits from the cavity through the view hole to an environment outside of the outer surface of the housing.

The housing further includes at least one hollow cooling channel formed between the outer surface and the inner surface of the housing body and spaced apart from the purge channel. Each respective cooling channel among the at least one cooling channel includes a fluid inlet located at the proximal end of the housing body and a fluid outlet. Each respective cooling channel among the at least one cooling channel is configured to define a flow path of a coolant fluid received through the fluid inlet. The flow path includes initially flowing from the fluid inlet toward the distal end, and subsequently flowing toward the fluid outlet for expulsion. The coolant fluid includes one of: a gas from a plenum coupled to both the gas inlet and the fluid inlet, or a liquid from a liquid source coupled to the fluid inlet. In some examples, the at least one cooling channel can include multiple cooling channels including a first cooling channel and a second cooling channel. The purge channel and the multiple cooling channels are spaced apart from each other in a pattern.

In some examples, the at least one cooling channel includes a closed-loop cooling channel. The fluid outlet of the closed-loop cooling channel is located at the proximal end of the housing body and is spaced apart from the fluid inlet of the closed-loop cooling channel. The flow path defined by the closed-loop cooling channel includes initially flowing from the fluid inlet toward the distal end, and subsequently flowing toward the fluid outlet of the closed-loop cooling channel for expulsion including flowing through a turn of the closed-loop cooling channel that redirects the coolant fluid away from the distal end. In an alternative example, the fluid outlet includes multiple fluid outlets located distally from the fluid inlet and through the outer surface.

A lateral cross section of the purge channel or a lateral cross section of the at least one cooling channel can include a round shape, an arc shape, or a polygon shape.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
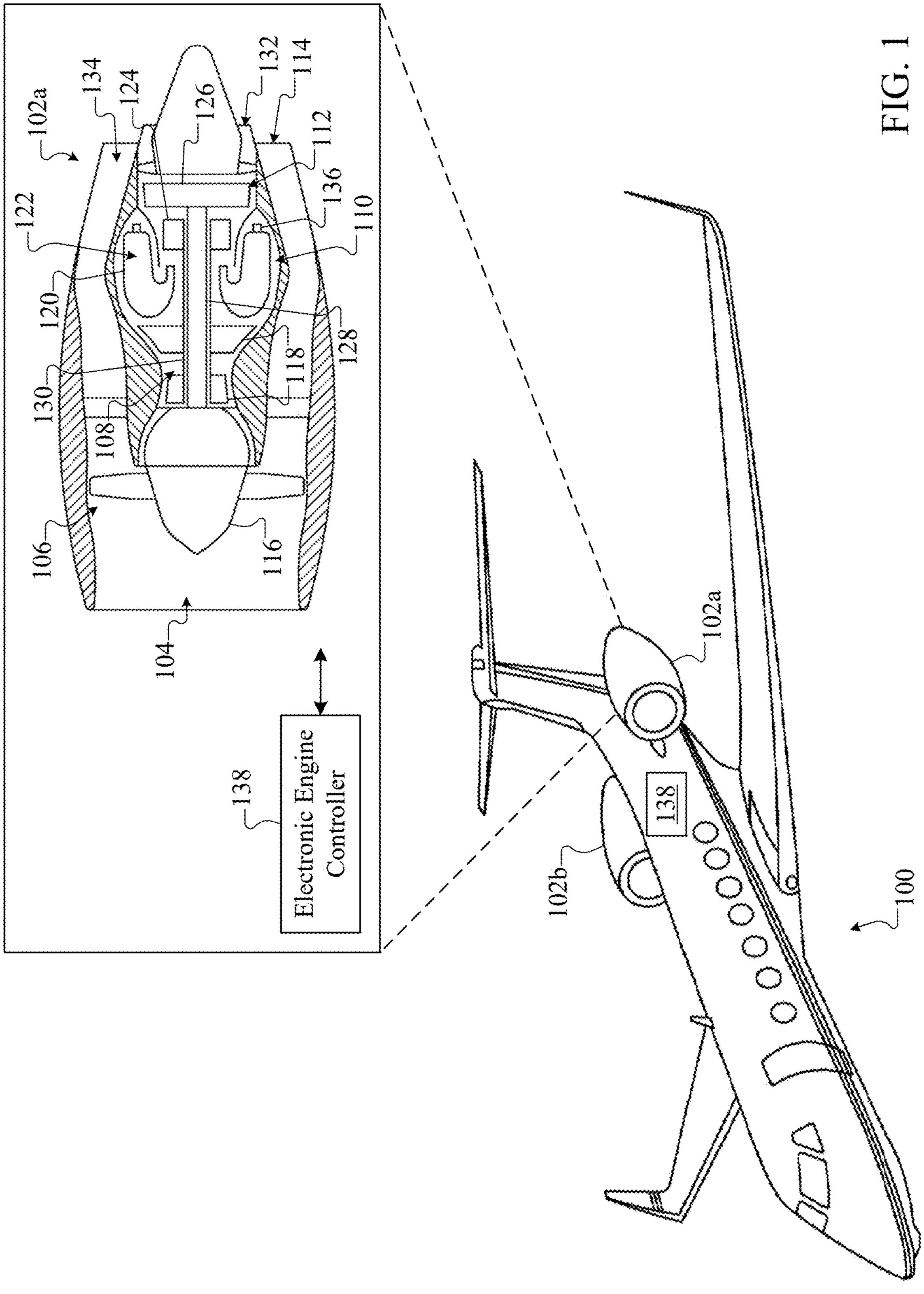
FIG. 1 illustrates an example aircraft supporting an integrally cooled optical probe according to this disclosure.

FIGS. 1 through 7, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, a gas turbine engine of an aircraft typically includes a combustion system. The combustion system is located between a compressor and a turbine. The combustion system receives compressed air from the compressor and fuel from a fuel injection system. The combustion system carries out a combustion process to produce high-energy gases to produce thrust and turn various rotatable blades of the turbine, such as high pressure turbine (HPT) blades, intermediate pressure turbine (IPT) blades, or low pressure turbine (LPT) blades. The combustion process generates a large amount of heat that the high-energy gases convey to the various rotatable blades of the turbine. These blades usually have thermal operating limits, such as upper and lower operating temperatures. A long wave infrared (LWIR) sensor can be strategically positioned within the gas turbine engine such that a probe is pointed toward one of the various rotatable blades to measure the temperature of the blade during operation without contacting the blade. The probe of the LWIR sensor can include a set of lenses.

Thermal imaging is used in turbine airfoil design and is advantageous to gas turbine engine development overall. High resolution, full field thermal images allow for cooling hole mapping, validation of thermal models, and anomaly detection.

A common approach for thermal imaging is to use a periscope style probe in which a mirror or mirrored prism along with focusing lenses are contained within a probe housing that protrudes into the flow path of the turbine of the engine. Due to the temperature limitations of the components as well as the adhesives used to assemble the components, cooling is typically required.

To provide the cooling, a common practice is to utilize concentric tubes, including an outer housing within which is an optical assembly. Between these two components is the cooling flow area, exiting out of the viewing hole within the gas path. In other words, the concentric tubes include the outer housing and an inner housing (referred to as the optical housing) and a separation gap between the inner and outer housings such that a coolant fluid (such as air) flows into the separation gap surrounding the inner housing and exits the viewing hole. Ingress hole size and required cooling flow are typically firm requirements, and the thickness of the housing of the probe is determined by structural capability. As a result of prioritizing safe operating temperatures and effective cooling, the size of the optics of the optical assembly is restricted by (dependent upon) the cooling flow requirement and probe's housing's thickness. As a result, the size of the optics (such as the diameter of the lenses of the optical assembly) tend to be suboptimal.

It is desired to have thermal imaging of post-combustion blades and vanes of a gas turbine engine. Also, it is desirable to improve the optical assembly of a LWIR sensor by increasing the diameter of the lenses. The useful life of an aircraft gas turbine engine can be multiple decades, and therefore, it may not be desirable to redesign an entire gas turbine engine in order to achieve improvements of the LWIR sensor. In some aircraft, a change to the size of the housing of the LWIR sensor would cause a redesign of the size, location, and orientation of other components of the gas turbine engine, which can be considered a redesign of the gas turbine engine.

The embodiments of this disclosure improve the optical assembly of a LWIR sensor by enabling the diameter of the lenses to increase without changing the outer dimensions of the housing of the LWIR sensor. That is, embodiments of this disclosure provide an improved LWIR sensor, which includes an integrally cooled optical probe, and which is swappable with a conventional LWIR sensor. Further, embodiments of this disclosure satisfy cooling requirements for operating within temperature limit, such as below 300° F.

FIG. 1 illustrates an example aircraft 100 supporting an integrally cooled optical probe according to this disclosure. As shown in FIG. 1, the aircraft 100 represents an airplane having multiple engines 102*a*-102*b*, where at least one engine 102*a* is positioned on one side of the aircraft 100 and at least one engine 102*b* is positioned on the opposite side of the aircraft 100. Note that the form of the aircraft 100 shown in FIG. 1 is for illustration only and that the aircraft 100 may have any other suitable form. As one example, the engines 102*a*-102*b* of the aircraft 100 may be positioned on the wings of the aircraft 100 rather than towards the rear of the aircraft 100. As another example, while the aircraft 100 in this example has two engines 102*a*-102*b*, the aircraft 100 may have other numbers of engines, such as when two or more engines are positioned on each side of the aircraft 100. As noted above, the aircraft 100 can suffer from a LWIR sensor that includes a suboptimal size of optics.

As shown in FIG. 1, each engine 102*a*-102*b* includes various components used to create thrust for moving the aircraft 100. In this example, each engine 102*a*-102*b* can include an inlet 104, a fan section 106, a compressor section 108, a combustion section 110, a turbine section 112, and an exhaust 114. The inlet 104 generally includes an opening that allows air to be drawn into the engine 102*a*-102*b*. The fan section 106 includes a fan rotor 116, and the compressor section 108 includes a compressor rotor 118. The combustion section 110 includes an annular combustor 120 having a combustion chamber 122. The turbine section 112 includes a high-pressure turbine (HPT) rotor 124 and a low-pressure turbine (LPT) rotor 126. Each fan rotor 116, 124, and 126 typically includes rotor blades arranged circumferentially around and connected to one or more respective rotor disks. The fan rotor 116 is connected to the LPT rotor 126 through a low-speed shaft 128, and the compressor rotor 118 is connected to the HPT rotor 124 through a high-speed shaft 130. The low-speed shaft 128 can extend through a bore of the high-speed shaft 130 between the fan rotor 116 and the LPT rotor 126.

During operation, air enters each engine 102*a*-102*b* through the inlet 104, and the air is directed through the fan section 106 into a core flow path 132 and a bypass flow path 134. The core flow path 132 extends sequentially through the sections 108-112 of the engine 102*a*-102*b*, which is often referred to as an "engine core." The air within the core flow path 132 may often be referred to as "core air." The bypass flow path 134 extends through a bypass duct, which bypasses the engine core. The air within the bypass flow path 134 may often be referred to as "bypass air." The core air is compressed by the compressor rotor 118 and directed into the combustion chamber 122 of the annular combustor 120. Fuel is injected into the combustion chamber 122 via one or more fuel injectors 136 and mixed with the compressed core air to provide a fuel-air mixture. The fuel-air mixture is ignited, and the resulting combustion products flow through and sequentially cause the HPT rotor 124 and the LPT rotor 126 to rotate. Rotation of the HPT rotor 124 drives rotation of the compressor rotor 118 and thereby causes compression of air received from the inlet 104 into the core flow path 132. Rotation of the LPT rotor 126 drives rotation of the fan rotor 116, which propels bypass air through and out of the bypass flow path 134. The propulsion of the bypass air can account for a significant portion (such as a majority) of the thrust generated by the engine 102*a*-102*b*.

Note that this represents a brief description of one example type of engine 102*a*-102*b* that may be used on an aircraft 100. Additional details of this type of engine 102*a*-102*b* are known to people skilled in the relevant art and are omitted here for brevity. Also note that the example engine 102*a*-102*b* shown here represents a turbofan engine, which is one type of engine 102*a*-102*b* that may be used on the aircraft 100. However, any other suitable type of engine now known or later developed may be used with the aircraft 100. As particular examples, the engines 102*a*-102*b* of the aircraft 100 may represent turbofan engines, turbojet engines, turboprop engines, or turboshaft engines.

As described in more detail below, the engines 102*a*-102*b* can be associated with an electronic engine control (EEC) system 138 or a flight management system (FMS) of the aircraft 100 according to this disclosure. For example, the EEC 138 may be implemented using one or more processing devices, such as one or more microprocessors, microcontrollers, digital signal processors (DSPs), application specific integrated circuits (ASICs), field programmable gate arrays (FPGAs), or discrete circuitry. This disclosure does not limit the EEC 138 to any particular computing device or system. Also, in some embodiments, the EEC 138 can connect to and receive inputs from one or more sensors of the gas turbine engine, such as LWIR sensors (not shown in FIG. 1) that measure temperatures of the rotor blades in the turbine section 112.

Although FIG. 1 illustrates one example of an aircraft 100 supporting an integrally cooled optical probe, various changes may be made to FIG. 1. For example, as noted above, the form of the aircraft 100 and the positions of the engines 102*a*-102*b* on the aircraft 100 can vary depending on the implementation. Also, the aircraft 100 may include more than two engines, such as two or more engines on one side of the aircraft 100 and two or more engines on the opposite side of the aircraft 100. In those cases, the techniques described in this disclosure may be applied to pairs of engines, where each pair includes an engine in one position on one side of the aircraft 100 and an engine in the same position on the opposite side of the aircraft 100.

Figure 2:
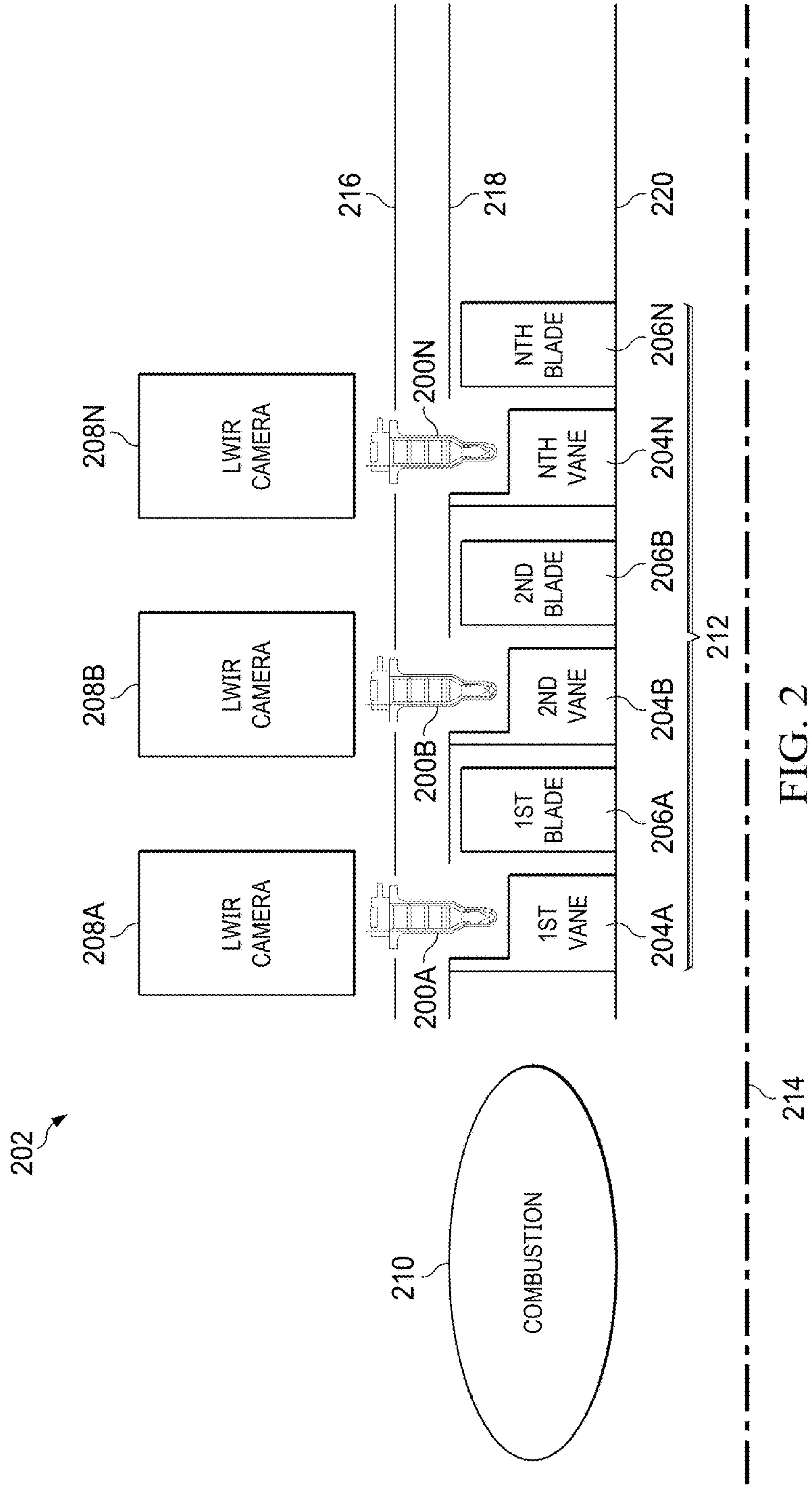
FIG. 2 illustrates a system block diagram of a longitudinal cross-section of a gas turbine engine that includes one or more integrally cooled optical probes according to this disclosure.

FIG. 2 illustrates a system block diagram of a longitudinal cross-section of a gas turbine engine 202 that includes one or more integrally cooled optical probes 200*a*-200*n* according to this disclosure. The gas turbine engine 202 can be the same as or similar to each engine 102*a*-102*b* of FIG. 1 and can include components thereof. For example, the combustion section 210 and the turbine section 212 can represent corresponding components 110 and 112 of FIG. 1, respectively. Any integrally cooled optical probe 200 among multiple integrally cooled optical probes 200*a*-200*n* can be included within the engine 102*a*-102*b* of FIG. 1. The embodiment of the gas turbine engine 202 shown in FIG. 2 is for illustration only, and other embodiments could be used without departing from the scope of this disclosure.

The gas turbine engine 202 includes a number (N) of blade-vane pairs, each pair formed of post-combustion blades and vanes of the gas turbine engine. For example, a first blade-vane pair includes a first vane 204*a* and a first blade 206*a*; a second blade-vane pair includes a second vane 204*b* and a second blade 206*b*; and so forth through the $n^{th}$ blade-vane pair includes the $n^{th}$ vane 204*n* and the $n^{th}$ blade 206*n*.

In this example, the multiple integrally cooled optical probes 200*a*-200*n* are strategically positioned within the gas turbine engine 202 and pointed toward the N vanes 204*a*-204*n*, respectively. A probe within each of the multiple integrally cooled optical probes 200*a*-200*n* measures the temperatures of the N vanes 204*a*-204*n*, respectively, during operation. The probe measures the temperature of the vane without contacting the vane.

Each of the multiple integrally cooled optical probes 200*a*-200*n* is coupled to a corresponding LWIR cameras 208*a*-208*n*. The N LWIR cameras 208*a*-208*n* are coupled to the EEC, such as the EEC 138 of FIG. 1.

The cross-section view shows an engine centerline 214 about which sections (such as the combustion and turbine sections 210 and 212) of the gas turbine engine 202 are centered, an engine casting 216 such as a housing of a nacelle, an outer flow path wall 218, and an inner flow path wall 220. The core flow path of the core air of the gas turbine engine 202 is defined by the space between the outer and inner flow path walls 218 and 220.

Although FIG. 2 illustrates one example of a gas turbine engine 202 including N integrally cooled optical probes 200*a*-200*n*, various changes may be made to FIG. 2. For example, the N integrally cooled optical probes 200*a*-200*n* could instead be pointed at and measure temperatures of the blades 206*a*-206*n*. As another example, the N integrally cooled optical probes 200*a*-200*n* can be the closed-loop double-helix integrally cooled optical probe 400 of FIG. 4, the film cooling integrally cooled optical probe 500 of FIG. 5, or a mixture of both types of integrally cooled optical probes 400 and 500, as described further below.

Figure 3:
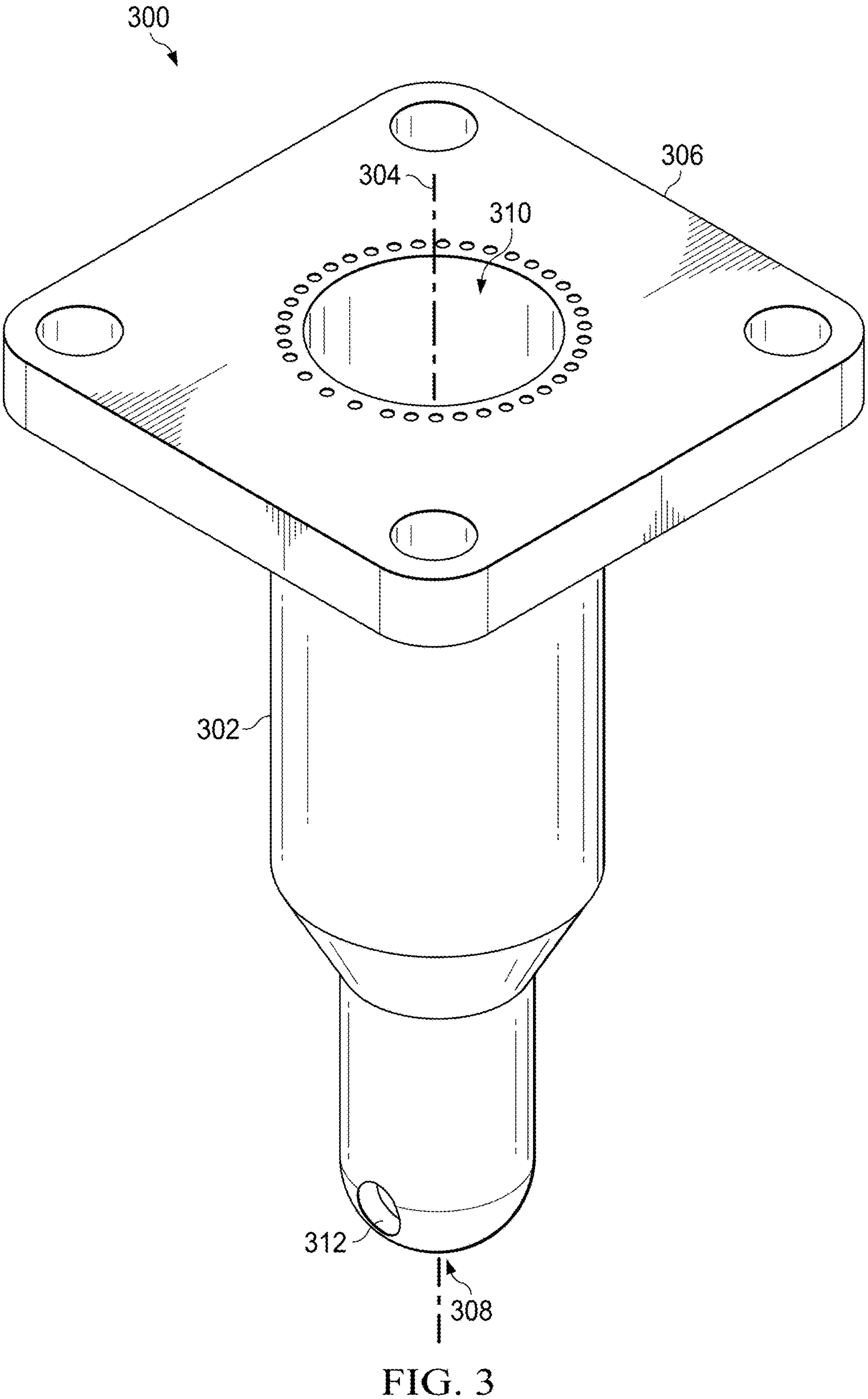
FIG. 3 illustrates a perspective view of a housing of an integrally cooled optical probe according to this disclosure.

FIG. 3 illustrates a perspective view of a housing 300 of an integrally cooled optical probe according to this disclosure. The embodiment of the housing 300 shown in FIG. 3 is for illustration only, and other embodiments could be used without departing from the scope of this disclosure. The housing 300 is included within each of the N integrally cooled optical probes 200*a*-200*n* of FIG. 2.

The housing 300 includes a housing body that includes an outer surface 302, and an inner surface opposite the outer surface 302. The housing body is elongated along a center longitudinal axis 304 from a proximal end 306 to a distal end 308. The inner surface defines and annularly surrounds a cavity 310 that is open at the proximal end 306 and closed at the distal end 308. The housing 300 includes a view hole 312.

Although FIG. 3 illustrates one example of a housing 300 of an integrally cooled optical probe, various changes may be made to FIG. 3. For example, a top view of the housing 300 can include the round shaped channels of FIG. 6 or the racetrack shaped channels of FIG. 7.

Figure 4:
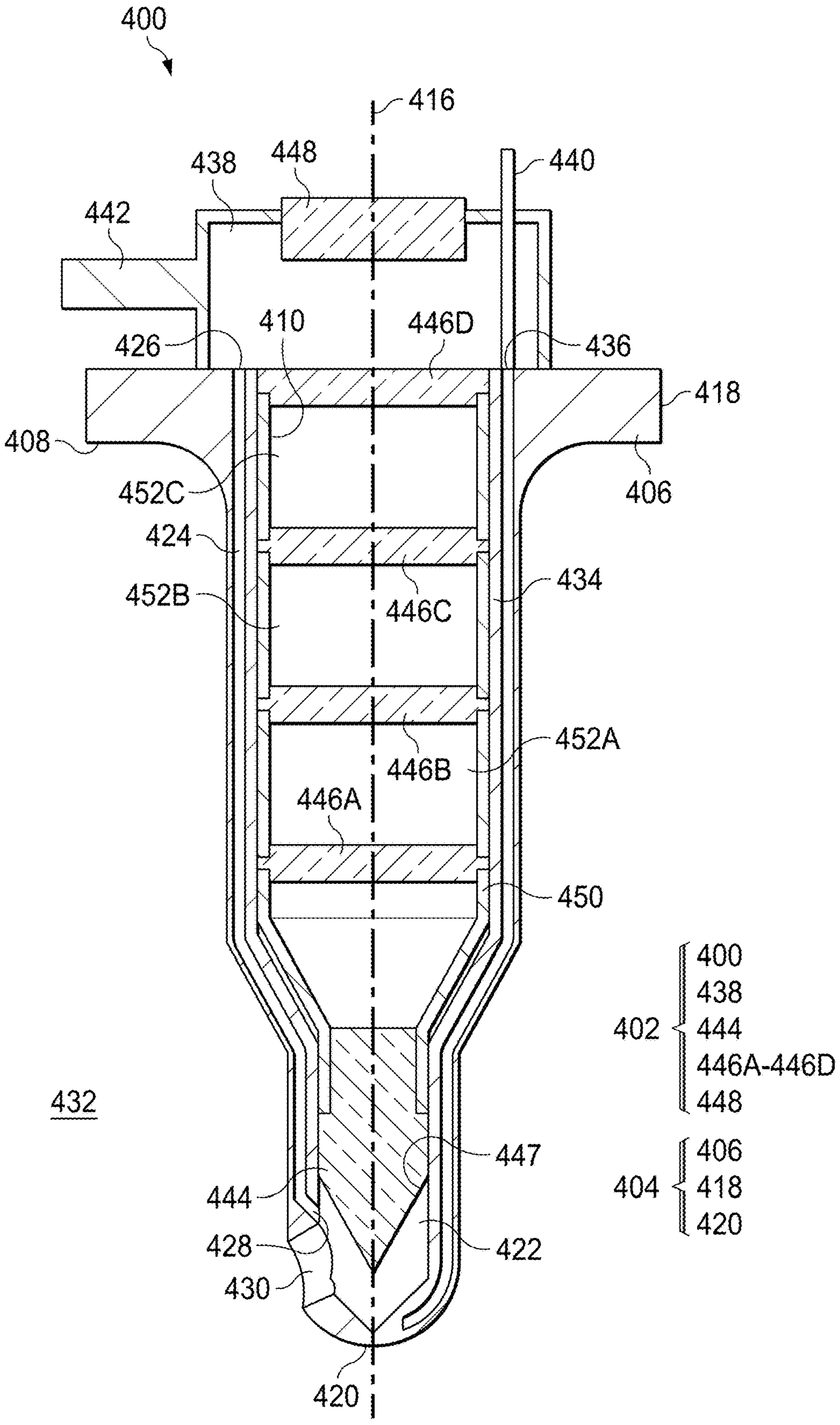
FIG. 4. illustrates a closed-loop double-helix integrally cooled optical probe as a component of a first thermal imaging sensor, according to this disclosure.

FIG. 4. illustrates a closed-loop double-helix integrally cooled optical probe 400 as a component of a first thermal imaging sensor 402 according to this disclosure. The embodiment of the closed-loop double-helix integrally cooled optical probe 400 shown in FIG. 4 is for illustration only, and other embodiments could be used without departing from the scope of this disclosure.

As described above, the first thermal imaging sensor 402 includes the double-helix integrally cooled optical probe 400. The double-helix integrally cooled optical probe 400 includes a housing 404, which can be the same are the housing 300 of FIG. 3. The housing 404 includes a housing body 406 that includes an outer surface 408 and an inner surface 410 opposite the outer surface 408. The housing body 406 is elongated along a center longitudinal axis 416 from a proximal end 418 to a distal end 420. The inner surface 410 defines and annularly surrounds a cavity 422 that is open at the proximal end 418 and closed at the distal end 420.

The housing 404 includes a hollow purge channel 424 formed between the outer surface 408 and the inner surface 410 of the housing body 406. The purge channel 424 includes a gas inlet 426 and a gas outlet 428. The purge channel 424 extends axially relative to the longitudinal axis 416 from the gas inlet 426 to the gas outlet 428.

The gas outlet 428 is located distally from the gas inlet 426 and through the inner surface 410 of the housing body 406. The gas outlet 428 directs gas into the cavity 422 toward the distal end.

The housing 404 includes a view hole 430 that extends through an entire thickness of the housing body 406, the thickness being the distance from the inner surface 410 to the outer surface 408. The gas within the cavity 422, such as the that expelled from purge channel 424 through the gas outlet 428, exits from the cavity 422 through the view hole 430 to an environment 432 outside of the outer surface 408 of the housing 404.

The housing 404 includes at least one hollow cooling channel 434 formed between the outer surface 408 and the inner surface 410 of the housing body 406 and spaced apart from the purge channel 424. Each respective cooling channel 434 among the at least one cooling channel includes a fluid inlet 436 located at the proximal end 418 of the housing body 406 and a fluid outlet (hidden from view in FIG. 4 but shown as 660*a*-660*b* of FIG. 6). Each respective cooling channel 434 is configured to define a flow path of a coolant fluid received through the fluid inlet 436. The flow path of the coolant fluid includes initially flowing from the fluid inlet 436 toward the distal end 420, and subsequently flowing toward the fluid outlet for expulsion from the cooling channel 434. As an example, the cooling channel 434 can define a U-shaped flow path of the coolant fluid, as such, multiple cooling channels 434 can form a series of U-shaped channels that are cooling feed paths and return paths. In the feed path, coolant fluid initially flows from the fluid inlet 436 toward the distal end 420. In the return path, the coolant fluid subsequently flows toward the fluid outlet for expulsion from the cooling channel 434. The coolant fluid expelled through the fluid outlet of the cooling channel 434 can be fluidly coupled to the fluid inlet 436, thereby forming a closed loop carrying the coolant fluid. That is, in the example U-shaped cooling channel, the at least one cooling channel 434 includes a closed-loop cooling channel. For example, warm coolant fluid expelled from the cooling channel can pass through a heat exchanger that removes some of the heat from the warm coolant fluid, thereby transforming the coolant fluid into cool coolant fluid that can be again input to the fluid inlet 436.

This disclosure is not limited to a U-shaped cooling channel 434. In such embodiments of the U-shaped or other than the U-shaped case, the at least one cooling channel 434 includes a closed-loop cooling channel in other embodiments. For example, the fluid outlet of the closed-loop cooling channel 434 is located at the proximal end 418 of the housing body 406 and is spaced apart from the fluid inlet 436 of the closed-loop cooling channel 434. The coolant fluid flow path defined by the closed-loop cooling channel 434 includes initially flowing from the fluid inlet toward the distal end, and subsequently flowing toward the fluid outlet of the closed-loop cooling channel for expulsion including flowing through a turn (such as a turn 562 of FIG. 5 or a turn of the U-shape) of the closed-loop cooling channel 434 that redirects the coolant fluid away from the distal end 420. The turn of the closed-loop cooling channel 434 can be a single turn of 180° such as in the case of the U-shape or can be one or more turns of a different angle. The first thermal imaging sensor 402 can further include an exit channel (analogous to the liquid source 440, but for the opposite direction of flow) located outside of the housing 404 and configured to couple (for example, physically connect or establish fluid communication) to the fluid outlet of the closed-loop cooling channel 434, and to direct the coolant expelled from the fluid outlet of the cooling channel 434 to a second fluid outlet of the exit channel.

For example, housing 404 can include multiple hollow cooling channels 434 including a first cooling channel and a second cooling channel, such that the purge channel 424 and the multiple cooling channels are spaced apart from each other in a pattern. That is, the first cooling channel can be spaced apart from the second cooling channel and from the purge channel 424 in a pattern, such a pattern of dispersal, an array pattern, or a pattern of being equidistantly spaced annularly around the cavity 422. In some embodiments, the first cooling channel represents a feed path, and the second cooling channel represents the return path, and the distal end of the feed path in the first cooling channel is fluidly coupled to an input of the return path of the second cooling channel.

In some embodiments, the coolant fluid includes a gas from a plenum 438 coupled to both the gas inlet 426 and the fluid inlet 436. In some embodiments, the coolant fluid includes a liquid from a liquid source 440 coupled to the fluid inlet 436. In some embodiments, the liquid form of the coolant fluid includes water or oil.

The first thermal imaging sensor 402 includes the plenum 438 that receives gas from a gas source external to the first thermal imaging sensor 402. The plenum 438 can be coupled to and input gas to the gas inlet 426 of the purge channel alone or coupled to both the gas and fluid inlets 426 and 436. The plenum 438 includes a connector 442 that can be connected to a gas source external to the first thermal imaging sensor 402, such as a gas compressor or a tank supply of gas. The working gas can be air, or cleaned air, high pressure air, gaseous nitrogen ($GN_2$), clean-dry compressed-filtered ("shop") air that has been processed through a desiccant and a filter and compressor set to a range of 100-120 psi in some embodiments. The plenum 438 can be configured to supply a specified gas flow such that the purge channel 424 functions as a directed purge that carries gas from the plenum 438 and out through the view hole 430.

The first thermal imaging sensor 402 includes internal components that are contained within the hollow cavity 422, including a prism 444 that redirects energy, a plurality of first lenses 446*a*-446*d* centered about the longitudinal axis 416. The plurality of first lenses 446*a*-446*d* includes convex and concave lenses that focus energy in a specified direction, such as toward the proximal end 418 or to a second lens 448. In some embodiments, when the purge channel 424 functions as a directed purge, the prism 444 is cleaned or maintained in a clean state, free from dirt and or particles that may block IR energy from reaching the reflective surface 447 (such as a mirror surface).

The first thermal imaging sensor 402 includes other components that are external to (such as located outside of) the housing 404, such as a second lens 448 that is also centered about the longitudinal axis 416. The second lens 448 can be coupled to the plenum 438.

During operation of the gas turbine engine, energy (such as heat or infrared radiation) emitted from an external device (such as one of the vanes 204*a*-204*n*) passes through the view hole 430 to impinge on the prism 444. The view hole is configured to guide energy emitted from the external device to impinge on the prism 444. The prism 444 can include a clear glass on one side that faces the view hole and directs the impinging energy to pass therethrough to impinge on a reflective surface 447 (such as a mirror) of the prism 444. The reflective surface 447 redirects the impinging energy to a first lens 446*a*, which focuses the energy to a second lens 446*b*, which focuses the energy to a third lens 446*c*, which focuses the energy to a fourth lens 446*d* among the first lenses, which focuses the energy to a fifth lens that is the second lens 448. A first spacer 450 is located between and provides a specified separation distance from a proximal end of the prism 444 to a distal end of the first lens 446*a*. A plurality of second spacers 452*a*-452*c* are located between adjacent pairs among the plurality of first lenses to provides specified separation distances between each adjacent pair of the first lenses.

Although FIG. 4 illustrates one example of a closed-loop double-helix integrally cooled optical probe 400, various changes may be made to FIG. 4. For example, the fluid outlet of the cooling channel 434 can multiple fluid outlets located distally from the fluid inlet and through the outer surface, as shown in FIG. 5 as described further below.

Figure 5:
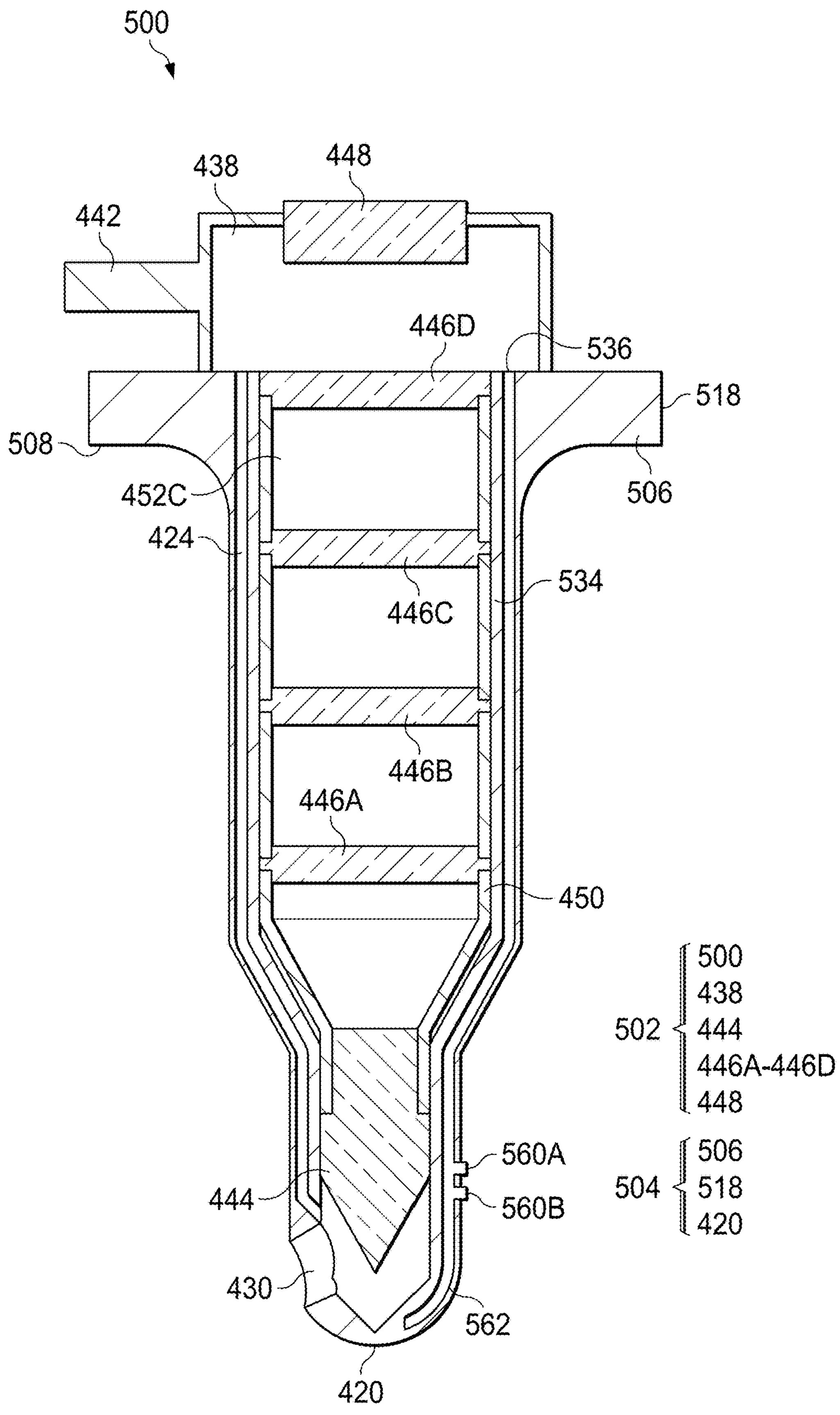
FIG. 5. illustrates an example of an open-loop film cooling integrally cooled optical probe as a component of a second thermal imaging sensor, according to this disclosure.

FIG. 5 illustrates an example of an open-loop film cooling integrally cooled optical probe 500 as a component of a second thermal 502 imaging sensor according to this disclosure. The embodiment of the film cooling integrally cooled optical probe 500 shown in FIG. 5 is for illustration only, and other embodiments could be used without departing from the scope of this disclosure.

For ease of distinction, the film cooling integrally cooled optical probe 500 of FIG. 5 will be referred to more simply as the "open-loop" probe 500, in comparison to the closed-loop double-helix integrally cooled optical probe 400 of FIG. 4 referred more simply as the "closed-loop" probe 400. To avoid duplicative description, it is understood that the open loop probe includes the same components as the closed-loop probe 400 of FIG. 4, except differences will be described further below. For context, some of the components 420, 422, 430, 434, 438, 442, 446A, 448, and 450 of FIG. 4 are reproduced in FIG. 5. The housing 504, housing body 506 and its outer surface 508, and the proximal end 518 in the FIG. 5 are similar to corresponding components 404, 406, 408, and 418 in FIG. 4.

As described above, the open-loop probe 500 includes an at least one hollow open-loop cooling channel 534 formed between the outer surface 508 and the inner surface of the housing body 506. Each open-loop cooling channel 534 is spaced apart from the purge channel 424. Each respective open-loop cooling channel 534 among the at least one cooling channel includes a fluid inlet 536 located at the proximal end 518 of the housing body 506 and multiple fluid outlets 560*a*-560*b*. The multiple fluid outlets 560*a*-560*b* can be located distally from the fluid inlet 536 and can be through the outer surface 508. During operation of the gas turbine engine, working fluid (gas or liquid) expelled through the multiple fluid outlets 560*a*-560*b* can be received into a reservoir tank or a heat exchanger that removes heat from the warm working fluid and re-circulates or returns cool working fluid into fluid inlet 536. In some embodiments, the multiple fluid outlets 560*a*-560*b* can be part of an open-loop cooling channel 534 that includes a turn 562, which can change the direction of the coolant fluid to a direction away from the distal end 420.

Although FIG. 5 illustrates one example of an open-loop film cooling integrally cooled optical probe 500 as a component of a second thermal imaging sensor 502, various changes may be made to FIG. 5. For example, the housing 504 enables for film cooling systems. Further, as described above, the embodiments of this disclosure relocate the cooling flow to within the housing body 406, 506 of the housing 404 (such as the outer and only housing of the optical assembly). This may be possible via a combination of machining techniques and small hole electrical discharge machining (EDM) techniques, however the housing 300, 404, 504 is well-suited for being fabricated using additive manufacturing processes, such as 3D-printing.

As described above, the embodiments of this disclosure provide multiple technical advantages. By having the coolant fluid flow path contained within the housing body 406, 506, the embodiments of this disclosure provide a technical advantage of eliminating any need for an optical housing (also referred to as an inner housing that is spaced apart from the inner surface of the outer housing by an airgap). Further, the first and second thermal image sensors 402, 502 of this disclosure reduce the number of parts used to build the sensor, which leads to a reduction in total wall thicknesses—that dimension that directly limits the lens size. As another technical advantage, embodiments of this disclosure enable larger optics (internal lenses with wider diameters) for a given size of the outer dimensions of the housing 300, 404, 504. Larger lenes internally contained within the housing 300, 404, 504 enables for more throughput and/or a larger viewing area. In other words, the cavity 310 within the housing 300, 404, 504 has a wider diameter than a conventional LWIR sensor, which enables maximizing of lens size for a given ingress size and cooling requirement.

In some embodiments, the housing 300, 404, 504 improves cooling efficiency by reducing a cooling requirement or reducing a high overall temperature capability. In some embodiments, the housing 300, 404, 504 enables a reduction in total foreign gas entering the gas path, such as the flow path of the gas inlet 426 and fluid inlet 436, 536.

Figure 6:
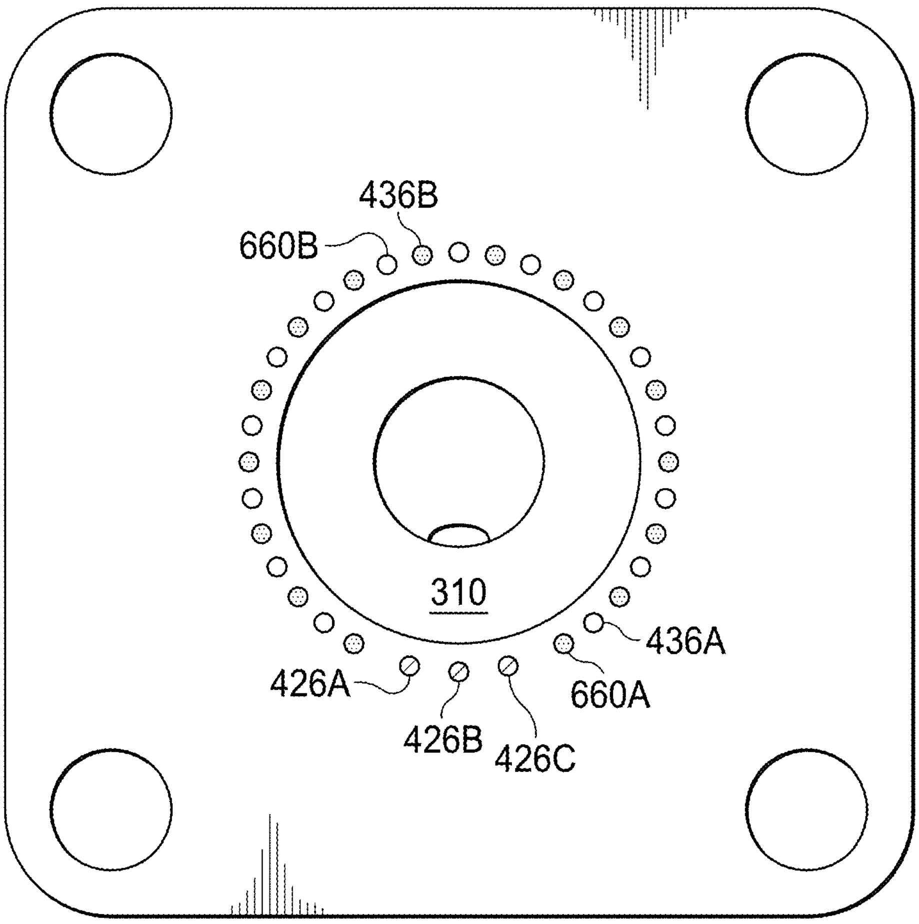
FIGS. 6 and 7 illustrate two examples of a top view of the housing of the integrally cooled optical probe of FIG. 4, according to this disclosure.
Figure 7:
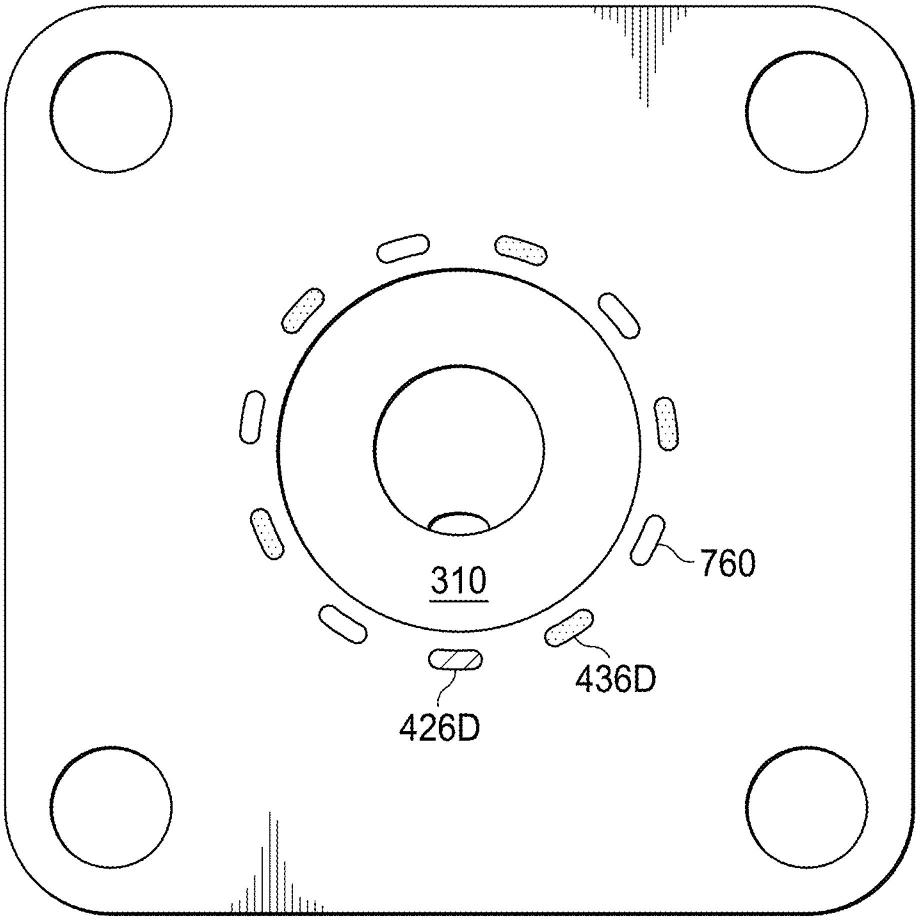

FIGS. 6 and 7 illustrate two examples of a top view of the housing 404 of the integrally cooled optical probe of FIG. 4. FIG. 6 illustrates top view of the housing 404 of the double-helix integrally cooled optical probe 400 of FIG. 4, wherein a lateral cross section of the at least one purge channel (including gas inlet 426*a*-426*c*) and a lateral cross section of the at least one cooling channel (including fluid inlets 436*a*-436*b*) include a round shape. As an example, the round shape can be a circular shape, an elliptical shape, or an oval shape. FIG. 6 also shows that a lateral cross section of the at least one cooling channel (including fluid outlet 660*a*-660*b*) includes a round shape. Among multiple closed-loop cooling channels located annularly around the cavity 310, a first closed-loop cooling channel includes fluid inlet 436*a* and fluid outlet 660*a*, and a second closed-loop cooling channel includes fluid inlet 436*b* and fluid outlet 660*b*. The closed-loop cooling channel fluid inlets 436*a*-436*b* and fluid outlets 660*a*-660*b* can alternate annularly around the cavity 310.

FIG. 7 illustrates a top view of the housing 404 of the double-helix integrally cooled optical probe 400 of FIG. 4, wherein a lateral cross section of the at least one purge channel (including gas inlet 426*d*) and a lateral cross section of the at least one cooling channel (including fluid inlet 436*d*) includes a racetrack shape. As an example, the racetrack shape can be an arc shape or a polygon shape (such as a rectangle). FIG. 7 also shows that a lateral cross section of the at least one cooling channel outlet 760 includes a racetrack shape, and that multiple closed-loop cooling channels are located annularly around the cavity 310.

In some embodiments, the purge channel inlet includes a racetrack shape, and the cooling channel inlet includes a round shape. Alternatively, the purge channel inlet can include a round shape while the cooling channel inlet includes a racetrack shape.

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A housing for internal components of an optical probe, the housing comprising:

a housing body including an outer surface and an inner surface opposite the outer surface, the housing body elongated along a center longitudinal axis from a proximal end to a distal end, wherein the inner surface defines and annularly surrounds a cavity that is open at the proximal end and closed at the distal end; and a hollow purge channel that includes a gas inlet and a gas outlet, that extends axially relative to the center longitudinal axis from the gas inlet to the gas outlet, and that is formed between the outer surface and the inner surface of the housing body, wherein a plenum is coupled to the gas inlet of the hollow purge channel, wherein the gas outlet is located distally from the gas inlet and through the inner surface of the housing body, and directs gas into the cavity toward the distal end, wherein the internal components include a prism and a plurality of first lenses centered about the center longitudinal axis, and a second lens is located outside of the housing and centered about the center longitudinal axis, and coupled to the plenum.

2. The housing of claim 1, further comprising a view hole that extends through an entire thickness of the housing body, and that is configured to guide energy emitted from an external device to impinge on the prism among the internal components of the optical probe, wherein the internal components of the optical probe are contained within the cavity, and wherein the gas outlet faces the prism and is configured to direct a gas expelled from the hollow purge channel to impinge on the prism such that the gas exits from the cavity through the view hole to an environment outside of the outer surface of the housing.

3. The housing of claim 1, further comprising at least one hollow cooling channel formed between the outer surface and the inner surface of the housing body and spaced apart from the hollow purge channel, wherein each respective cooling channel among the at least one hollow cooling channel includes a fluid inlet located at the proximal end of the housing body and a fluid outlet, and is configured to define a flow path of a coolant fluid received through the fluid inlet, and wherein the flow path includes initially flowing from the fluid inlet toward the distal end, and subsequently flowing toward the fluid outlet for expulsion, and wherein the coolant fluid includes one of:

a gas from the plenum, wherein the plenum is coupled to both the gas inlet and the fluid inlet, or a liquid from a liquid source coupled to the fluid inlet.

4. The housing of claim 3, wherein the at least one hollow cooling channel includes multiple cooling channels including a first cooling channel and a second cooling channel, and wherein the hollow purge channel and the multiple cooling channels are spaced apart from each other in a pattern.

5. The housing of claim 3, wherein:

the at least one hollow cooling channel includes a closed-loop cooling channel;

the fluid outlet of the closed-loop cooling channel is located at the proximal end of the housing body and is spaced apart from the fluid inlet of the closed-loop cooling channel; and the flow path defined by the closed-loop cooling channel includes initially flowing from the fluid inlet toward the distal end, and subsequently flowing toward the fluid outlet of the closed-loop cooling channel for expulsion including flowing through a turn of the closed-loop cooling channel that redirects the coolant fluid away from the distal end.

6. The housing of claim 3, wherein the fluid outlet includes multiple fluid outlets located distally from the fluid inlet and through the outer surface.

7. The housing of claim 3, wherein a lateral cross section of the hollow purge channel or a lateral cross section of the at least one hollow cooling channel includes:

a round shape, an arc shape, or a polygon shape.

8. An optical probe comprising:

a housing that comprises:

a housing body including an outer surface and an inner surface opposite the outer surface, the housing body elongated along a center longitudinal axis from a proximal end to a distal end, wherein the inner surface defines and annularly surrounds a cavity that is open at the proximal end and closed at the distal end; and a hollow purge channel that includes a gas inlet and a gas outlet, that extends axially relative to the center longitudinal axis from the gas inlet to the gas outlet, and that is formed between the outer surface and the inner surface of the housing body, wherein a plenum is coupled to the gas inlet of the hollow purge channel, wherein the gas outlet is located distally from the gas inlet and through the inner surface of the housing body, and directs gas into the cavity toward the distal end; and internal components included within the cavity, wherein the internal components include a prism and a plurality of first lenses centered about the center longitudinal axis, and a second lens is located outside of the housing and centered about the center longitudinal axis, and coupled to the plenum.

9. The optical probe of claim 8, wherein the housing further comprises a view hole that extends through an entire thickness of the housing body, and that is configured to guide energy emitted from an external device to impinge on the prism among the internal components of the optical probe; and wherein the gas outlet faces the prism and is configured to direct a gas expelled from the hollow purge channel to impinge on the prism such that the gas exits from the cavity through the view hole to an environment outside of the outer surface of the housing.

10. The optical probe of claim 8, wherein the housing further comprises at least one hollow cooling channel formed between the outer surface and the inner surface of the housing body and spaced apart from the hollow purge channel, wherein each respective cooling channel among the at least one hollow cooling channel includes a fluid inlet located at the proximal end of the housing body and a fluid outlet, and is configured to define a flow path of a coolant fluid received through the fluid inlet, and wherein the flow path includes initially flowing from the fluid inlet toward the distal end, and subsequently flowing toward the fluid outlet for expulsion, and wherein the coolant fluid includes one of:

a gas from the plenum, wherein the plenum is coupled to both the gas inlet and the fluid inlet, or a liquid from a liquid source coupled to the fluid inlet.

11. The optical probe of claim 10, wherein the at least one hollow cooling channel includes multiple cooling channels including a first cooling channel and a second cooling channel, and wherein the hollow purge channel and the multiple cooling channels are spaced apart from each other in a pattern.

12. The optical probe of claim 10, wherein:

the at least one hollow cooling channel includes a closed-loop cooling channel;

the fluid outlet of the closed-loop cooling channel is located at the proximal end of the housing body and is spaced apart from the fluid inlet of the closed-loop cooling channel; and the flow path defined by the closed-loop cooling channel includes initially flowing from the fluid inlet toward the distal end, and subsequently flowing toward the fluid outlet of the closed-loop cooling channel for expulsion including flowing through a turn of the closed-loop cooling channel that redirects the coolant fluid away from the distal end.

13. The optical probe of claim 10, wherein the fluid outlet includes multiple fluid outlets located distally from the fluid inlet and through the outer surface.

14. The optical probe of claim 10, wherein a lateral cross section of the hollow purge channel or a lateral cross section of the at least one hollow cooling channel includes:

a round shape, an arc shape, or a polygon shape.

15. A thermal imaging sensor comprising:

an optical probe comprising:

a housing, wherein the housing comprises:

a housing body including an outer surface and an inner surface opposite the outer surface, the housing body elongated along a center longitudinal axis from a proximal end to a distal end, wherein the inner surface defines and annularly surrounds a cavity that is open at the proximal end and closed at the distal end; and a hollow purge channel that includes a gas inlet and a gas outlet, that extends axially relative to the center longitudinal axis from the gas inlet to the gas outlet, and that is formed between the outer surface and the inner surface of the housing body, wherein the gas outlet is located distally from the gas inlet and through the inner surface of the housing body, and directs gas into the cavity toward the distal end; and internal components contained within the cavity, including a prism and a plurality of first lenses centered about the center longitudinal axis;

a plenum coupled to the gas inlet of the hollow purge channel and configured to receive gas from a gas source external to the thermal imaging sensor; and a second lens located outside of the housing and centered about the center longitudinal axis, and coupled to the plenum.

16. The thermal imaging sensor of claim 15, wherein the housing further comprises a view hole that extends through an entire thickness of the housing body, and that is configured to guide energy emitted from an external device to impinge on the prism; and wherein the gas outlet faces the prism and is configured to direct a gas expelled from the hollow purge channel to impinge on the prism such that the gas exits from the cavity through the view hole to an environment outside of the outer surface of the housing.

17. The thermal imaging sensor of claim 15, wherein the housing further comprises at least one hollow cooling channel formed between the outer surface and the inner surface of the housing body and spaced apart from the hollow purge channel, wherein each respective cooling channel among the at least one hollow cooling channel includes a fluid inlet located at the proximal end of the housing body and a fluid outlet, and is configured to define a flow path of a coolant fluid received through the fluid inlet, and wherein the flow path includes initially flowing from the fluid inlet toward the distal end, and subsequently flowing toward the fluid outlet for expulsion, and wherein the coolant fluid includes one of:

a gas from the plenum, wherein the plenum is coupled to both the gas inlet and the fluid inlet, or a liquid from a liquid source coupled to the fluid inlet.

18. The thermal imaging sensor of claim 17, wherein the at least one hollow cooling channel includes multiple cooling channels including a first cooling channel and a second cooling channel, and wherein the hollow purge channel and the multiple cooling channels are spaced apart from each other in a pattern.

19. The thermal imaging sensor of claim 17, wherein:

the at least one hollow cooling channel includes a closed-loop cooling channel;

the fluid outlet of the closed-loop cooling channel is located at the proximal end of the housing body and is spaced apart from the fluid inlet of the closed-loop cooling channel; and the flow path defined by the closed-loop cooling channel includes initially flowing from the fluid inlet toward the distal end, and subsequently flowing toward the fluid outlet of the closed-loop cooling channel for expulsion including flowing through a turn of the closed-loop cooling channel that redirects the coolant fluid away from the distal end.

20. The thermal imaging sensor of claim 17, wherein the fluid outlet includes multiple fluid outlets located distally from the fluid inlet and through the outer surface.

* * * * *